United States Patent [19]

Bodmin

[11] 4,393,811
[45] Jul. 19, 1983

[54] WEIGHTED TEAT CUP SHELL AND ASSEMBLY

[75] Inventor: Syd E. Bodmin, Otumoetai, New Zealand

[73] Assignee: Mae Lois Moore, Tauranga, New Zealand

[21] Appl. No.: 259,715

[22] Filed: May 1, 1981

[30] Foreign Application Priority Data

Mar. 24, 1981 [NZ] New Zealand .................... 196595

[51] Int. Cl.³ .............................................. A01J 5/04
[52] U.S. Cl. ................................................ 119/14.47
[58] Field of Search ............... 119/14.47, 14.48, 14.49, 119/14.5, 14.51, 14.52, 14.53

[56] References Cited

U.S. PATENT DOCUMENTS

| 1,620,916 | 3/1927 | Pessell | 119/14.49 |
| 3,099,246 | 7/1963 | Beskow | 119/14.47 X |
| 4,249,481 | 2/1981 | Adams | 119/14.47 X |

FOREIGN PATENT DOCUMENTS

| 251960 | 1/1967 | Austria | 119/14.47 |
| 2313137 | 9/1973 | Fed. Rep. of Germany | 119/14.47 |
| 85551 | 6/1920 | Switzerland | 119/14.49 |

Primary Examiner—Robert P. Swiatek
Attorney, Agent, or Firm—Ladas & Parry

[57] ABSTRACT

This invention provides a weighted teat cup shell and an assembly of the weighted teat cup shell with a teat cup inflation. The weighted teat cup shell includes at least one weight of a non-homogenous material in an upper portion thereof and the teat cup shell and inflation are provided with locating arrangement to prevent twisting of the inflation in the assembly.

9 Claims, 11 Drawing Figures

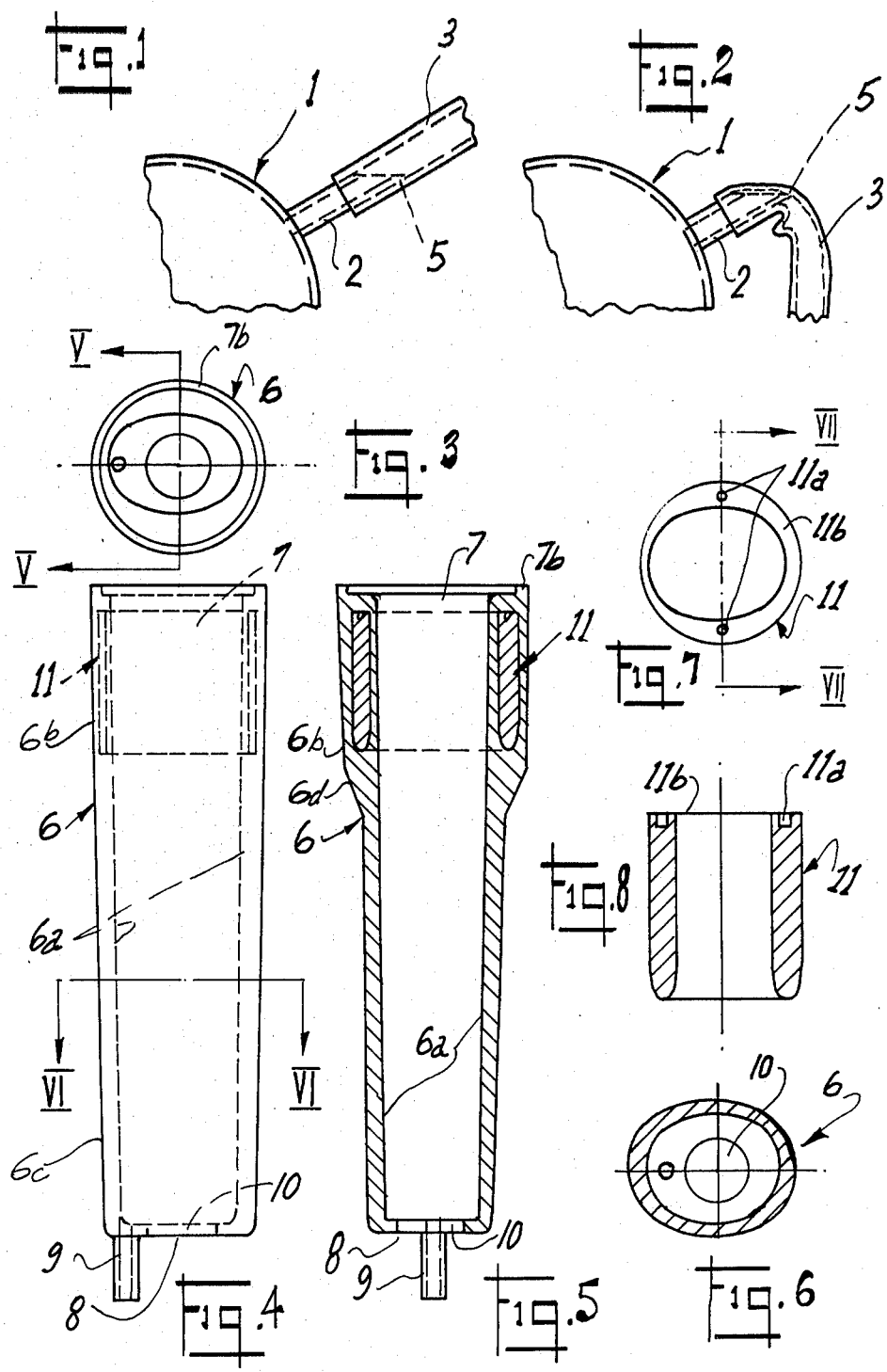

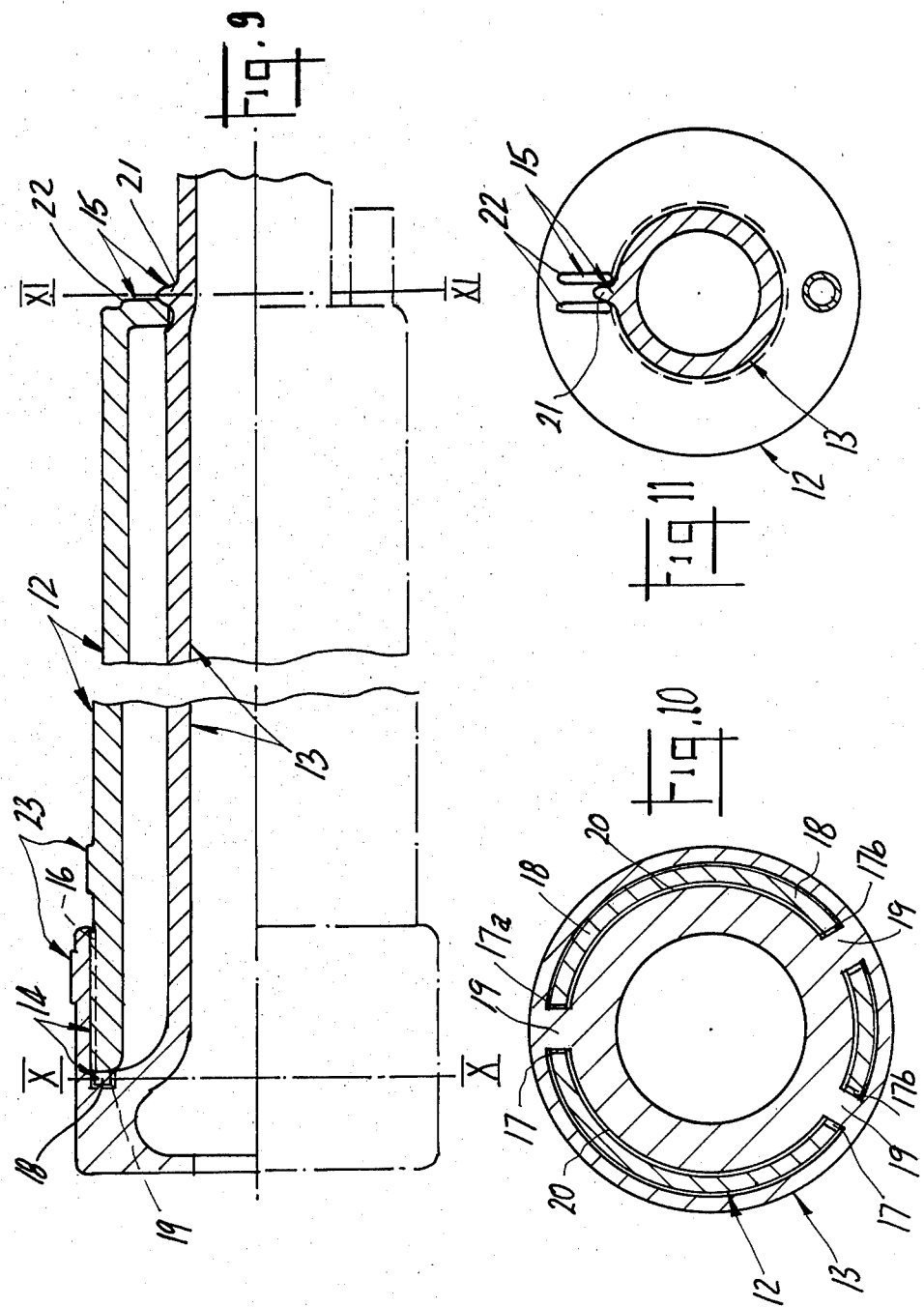

WEIGHTED TEAT CUP SHELL AND ASSEMBLY

This invention relates to teat cup shells and assemblies for milking apparatus.

In conventional milking apparatus a teat cup shell (usually in stainless steel) is used to encase individual inflations. In the majority of milking installations a vacuum source or sources is/are applied to individual clusters and accordingly as the teat cups are applied and removed it is desirable that excess air be prevented from entering the vacuum system, and for this to be achieved milk lines to unused teat cups must be individually isolated. In order to isolate the unused teat cups milk inlet nipples of cluster claws to which milk lines are connected are inclined outwardly and upwardly and when the teat cups are not in use these are allowed to fall such that the line to the milk inlet nipple will seal against the end of the nipple. A perfect seal however is not always obtained because of the relative inflexibility of the milk lines and because the centre of mass in a conventional teat cup assembly is often too close to the point where the milk line engages with the nipple of a cluster claw.

It is an object of the present invention to provide a weighted teat cup shell which will go some way to eliminating the aforesaid problem.

It is a further object of the present invention to provide a weighted teat cup shell in which the centre of mass in the teat cup shell is at the upper regions thereof.

Further common problems with milking apparatus is that one or more "quarters" of a cluster is not milking satisfactorily. This is often attributable to a situation where one end of the inflation twists radially with respect to the other end and as a result the teat cup inflation does not expand and contract fully as is desirable for efficient milking because the inflation is stressed in an undesirable manner. The problem is difficult to identify particularly by an operator unfamiliar with the mechanics of a milking machine who may not realise that "twisting" in an individual teat cup assembly or assemblies has taken place.

It is therefore a further object of the present invention to provide a teat cup assembly which will go some way to eliminating or reducing the problem of "twisting" of an inflation in teat cup assemblies.

Further objects and advantages of the present invention will become apparent from the ensuing description.

Accordingly by this invention there is provided a teat cup shell comprising a body having an upper portion with an open end arranged to receive a complimentary upper portion of a teat cup inflation and a lower portion including an aperture through which the lower portion of a teat cup inflation may pass wherein the body of the teat cup shell is formed in a mouldable material and includes at least one internally moulded and inset weight of a non-homogenous material in the wall thereof.

According to a further aspect of the present invention there is provided a teat cup assembly comprising a teat cup shell as aforesaid and a teat cup inflation wherein the teat cup inflation includes an upper downwardly foldable flange arranged to sealably engage over the outer upper surfaces of the teat cup shell and a lower portion including engagement means arranged to sealably engage with the aperture in the lower portion of the teat cup shell.

Aspects of the present invention will now be described by way of example with reference to the accompanying drawings in which:

FIG. 1 is a diagrammatic part-view of a cluster claw and milk nipple showing a milk line connected thereto, and FIG. 2 is a diagrammatic part-view of a cluster claw and milk nipple with a milk line connected thereto hanging vertically downwardly from the nipple, and FIG. 3 is a top view of a teat cup shell in accordance with one embodiment of the present invention, and FIG. 4 is a side view of the teat cup shell of FIG. 3, and FIG. 5 is a long-section taken at V:V of FIG. 3, and FIG. 6 is a cross-section taken at VI:VI of FIG. 4, and FIG. 7 is a top view of a weight for a teat cup shell in accordance with FIGS. 3 to 6, and FIG. 8 is a cross-section of the weight of FIG. 7 taken at VII:VII, and FIG. 9 is a diagrammatic partial long-section of the teat cup assembly in accordance with a further aspect of the present invention, and FIG. 10 is a diagrammatic cross-section taken at X:X of FIG. 9, and FIG. 11 is a cross section taken at XI:XI of FIG. 9.

Referring firstly to FIGS. 1 and 2 of the drawings, a cluster claw partially shown and generally indicated by arrow 1 is provided with nipples 2 to which milk lines 3 of a teat cup assembly are connected such that the interior of the cluster claw 1 is in communication with the interiors of the teat cup assembly. During milking the communication between the interiors of the cluster claw and the interiors of the teat cups is open and this situation is indicated by FIG. 1. Before and after individual cows have been milked and the teat cups are removed they are allowed to hang vertically downwardly from the cluster claws 1. In this situation the interior of the milk lines 3 or at least the lower portions thereof provide a seal with the bevelled ends 5 of the nipples 2.

To ensure an adequate seal is made in this situation, teat cup shell and assembly should be such as to ensure that the milk line 3 shuts off the bevelled end 5 of the milk nipple.

The present invention provides a weighted teat cup shell to meet the above requirements, said teat cup shell being formed of a mouldable material such as plastics and having an internally moulded and inset weight of a non-homogenous material in the wall thereof. With reference to FIGS. 3 to 8 of the drawings, a teat cup shell in accordance with the present invention comprises a tubular body generally indicated by arrow 6 having one open end 7, a lower end 8 mounting a pulsator line nipple 9 and defining a aperture 10 through which the lower end of a teat cup inflation (not shown) may pass.

Preferably the body 6 is provided with a bore 6a in which the width in a first plane is substantially greater than the width in another plane at right angles to the first plane and in the example given these requirements are met with an oval bore which may be converging from top to bottom. It will be appreciated from the ensuing description that the bore 6a of the teat cup shell 6 may be of an alternative configuration. In the example illustrated the upper end 6b of the teat cup body 6 is circular and includes a flange 7b to facilitate its engagement with a teat cup inflation.

The upper body portion 6b of the teat cup body is provided with an internally moulded and inset weight generally indicated by arrow 11. The inset weight, which may be a lead weight is formed in a continuous ring which is completely surrounded by mouldable material, and which is shaped in cross-section to correspond with the cross-section of the upper end 6b of the teat cup body 6.

As aforesaid the upper end 6b of the teat cup body 6 is circular having a substantially circular outer perimeter. When the teat cup shell is provided with an oval bore the outer perimeter of the lower end of the body 6 can also be oval shaped (see FIG. 6), a transition region being provided between the circular and oval perimeters at 6d, just below the weighted upper end 6b of the teat cup body 6. The shape of the outside of the teat cup body 6 as illustrated is most convenient as the oval lower end 6c of the body corresponds with the shape defined by a person's hand between the thumb and fingers when the hand closes.

The size of the weight 11 can be altered to suit various types of milking plants and to achieve the results required and accordingly the weight shown may be provided in other forms for example by providing a plurality of vertically disposed pellets or the like of a suitable high density steel or metal. It is also envisaged that the weight may be a fluid.

With reference to FIGS. 7 and 8 of the drawings illustrating an inset weight 11 for a teat cup shell in accordance with the present invention the inset weight is provided with a cross-section complimentary to the cross-section of the upper end 6b of the body 6 of the teat cup shell and is provided with a plurality of shallow holes 11a in the upper surface 11b thereof. The teat cup body 6 is formed in a die (not shown) whilst the inset weight is supported co-axially in the die when finger members (not shown) associated with the die engage with the holes 11a securing the weight 11 in position as the mouldable material is injected into the die and surrounds the weight. To complete the manufacturing process the finger members are disengaged from the holes 11a and the void areas created by the removal thereof are filled with an appropriate material.

With reference to FIGS. 9, 10 and 11 of the drawings, a teat cup assembly comprising a teat cup shell generally indicated by arrow 12 and a teat cup inflation generally indicated by arrow 13 can include location means indicated by arrows 14 and 15 respectively between the inflation and teat cup shell such that in use there can be no radial (or minimal) twisting of the inflation.

Such location means may take the form of a rib 16 or ribs (not shown) extending on the outer surface of the teat cup shell which is locatable beneath an expansible upper portion of the inflation. Alternatively or additionally, the location means may be provided in the form of grooves in the inflation locatable with raised portions in the shell or vice versa.

In the example given locating means 14 at the upper end of the assembly is provided by notches 17 in an upper flange 18 of a teat cup shell 12 as is illustrated by the drawings which are engagable with engaging members 19 located in a groove 20 in the teat cup inflation 13.

In the example given, three such notches 17 and complimentary engaging members 19 are provided, a notch 17a being provided in a first radial position and second and third spaced notches 17b and engaging members being provided in positions opposite the first position.

Lower locating means 15 at the lower end of the assembly, and as is illustrated by FIGS. 9 and 11, can comprise one or more knobs 21 (only one being shown) engagable between a pair of ridge members 22 extending from the lower surface of the teat cup shell 12.

To assist with the assembly of the inflation 13 the shell 12 can be provided with indexing means generally indicated by arrow 23 such as a fluted member or a raised arrowhead or ridge or the like positioned on the teat cup shell 12 and arranged to correspond with an identical mark or other indexing means on the inflation 13. In the particular embodiment illustrated, the indexing means may be in line with a rib 16 on the outer surface of an upper portion of the teat cup shell 12.

As will be readily appreciated location means other than that given in the example, which have particular relevance to the teat cup shell previously described may be provided and should be regarded as being within the spirit and scope of the present invention. Existing installations which may include a steel or metal teat cup shell (not shown) may be modified to include ribs with or without the provision of complimentary grooves or notches in the inflation or vice versa.

When the inflation 13 is engaged with a teat cup shell 12 having a bore 6a in which the width in one plane is substantially greater than the width in another plane at right angles thereto the pulsation chamber formed between the inflation exterior and the bore 6a of the teat cup shell 12 is of minimum volume however the change in shape of the teat cup inflation 13 during the squeeze phase of milking is not restricted. The effect and advantage of having a non-circular bore 6a as aforedescribed is to reduce the amount of energy required by the vacuum pump of a milking plant because the volume of the pulsation chamber of the assembly is reduced.

Aspects of the present invention have been described by way of example only and it will be appreciated that modifications and additions thereto may be made without departing from the spirit or scope thereof.

I claim:

1. A teat cup shell comprising a body having an upper portion with an open end arranged to receive a complimentary upper portion of a teat cup inflation and a lower portion including an aperture through which a lower portion of the teat cup inflation may pass wherein the body of the teat cup shell is formed in a mouldable material and includes at least one internally moulded and inset weight, said internally moulded and inset weight being positioned in the upper regions of the teat cup shell and extending in length substantially throughout the upper portion of the teat cup shell where the walls thereof are thicker such that the centre of mass of the teat cup shell due to the presence of the inset weight in the upper region is within the upper region;

wherein the upper region of said teat cup body is provided with a substantially circular outer surface and the lower region of the body is provided with a substantially oval outer surface and the internal bore of the teat cup shell is such that the width in a first plane is greater than the width in a second plane at right angles to the first plane.

2. A teat cup shell as claimed in claim 1 wherein the inset weight is shaped to be complimentary with the shape of the upper region of the teat cup shell and is arranged to be positioned coaxially therein.

3. A teat cup shell as claimed in claim 2 wherein the inset weight is a ring having a plurality of holes in an upper edge thereof such that the inset can be supported from one end coaxially in a die whilst mouldable material is injected into the die.

4. A teat cup shell as claimed in claim 3 wherein the mouldable material is a plastic.

5. A teat cup shell as claimed in claims 2 or 3 wherein the inset weight is made of a metal.

6. A teat cup shell assembly comprising a teat cup shell including a body having an upper portion with an open end arranged to receive a complimentary upper portion of a teat cup inflation and a lower portion including an aperture through which a lower portion of the teat cup inflation may pass wherein the body of the teat cup shell is formed in a mouldable plastic material and includes at least one internally moulded and inset metal weight said metal inset weight being positioned in the upper regions of the teat cup shell and extending in length substantially throughout the upper portion of the teat cup shell where the walls thereof are thicker such that the centre of the mass of the teat cup shell due to the presence of said metal inset weight in the upper region is within the upper region and said teat cup inflation including an upper downwardly foldable flange arranged to engage over the outer surfaces of the teat cup shell and a lower portion including engagement means arranged to engage with the aperture in the lower portions of the teat cup shell wherein there is provided locating means between the teat cup inflation and the teat cup shell such that in use there is no radial twisting or a minimal amount of twisting of the inflation.

7. A teat cup assembly as claimed in claim 6 wherein the inflation is of substantially circular cross-section and the bore of the teat cup shell is such that the width in a first plane is greater than the width in a second plane at right angles to the first plane such that expansion of the inflation within the bore of the teat cup shell is controlled by the shape of the bore.

8. A teat cup assembly as claimed in claim 6 wherein the locating means comprises notches in the inflation engageable with a complimentary flange or other raised portions of the shell or vice versa.

9. A teat cup assembly as claimed in claim 6 wherein the locating means are positioned at or adjacent to top and bottom of the teat cup shell in regions where the inflation and shell are in contact.

* * * * *